US008476610B2

(12) United States Patent
Hawman et al.

(10) Patent No.: US 8,476,610 B2
(45) Date of Patent: Jul. 2, 2013

(54) COMPOSITE SEGMENT COLLIMATORS FOR SPECT WITHOUT DEAD ZONES

(75) Inventors: Eric Hawman, Schaumburg, IL (US); Gengsheng Zeng, Salt Lake City, UT (US)

(73) Assignees: Siemens Medical Solutions USA, Inc., Malvern, PA (US); University of Utah Research Foundation, Salt Lake City, UT (US)

( * ) Notice: Subject to any disclaimer, the term of this patent is extended or adjusted under 35 U.S.C. 154(b) by 199 days.

(21) Appl. No.: 13/168,091

(22) Filed: Jun. 24, 2011

(65) Prior Publication Data

US 2012/0326059 A1 Dec. 27, 2012

(51) Int. Cl.

| | |
|---|---|
| ***G02B 5/00*** | (2006.01) |
| ***G21K 1/00*** | (2006.01) |
| ***H01J 1/52*** | (2006.01) |
| ***H01J 3/00*** | (2006.01) |
| ***H01J 5/18*** | (2006.01) |
| ***H01J 29/46*** | (2006.01) |

(52) U.S. Cl.

USPC .............. 250/505.1; 250/363.03; 250/363.04; 250/363.1; 250/366; 250/367; 250/368; 250/369; 250/370.09

(58) Field of Classification Search

USPC ............ 250/363.03, 363.04, 363.1, 366–369, 250/370.09, 505.1

See application file for complete search history.

(56) References Cited

U.S. PATENT DOCUMENTS

| | | | | |
|---|---|---|---|---|
| 4,659,935 | A * | 4/1987 | Hawman | 250/505.1 |
| 2002/0188197 | A1 * | 12/2002 | Bishop et al. | 600/436 |
| 2007/0069136 | A1 * | 3/2007 | Hawman | 250/363.1 |
| 2008/0156993 | A1 * | 7/2008 | Weinberg et al. | 250/363.03 |

OTHER PUBLICATIONS

Zeng, Larry, "Report #1: Imaging with Small No. of Views", (Interim Report—University of Utah/Siemens Static Cardiac SPECT Project), Feb. 28, 2009, 6 pages.

Zeng, Gengsheng L.; , "Multi-divergent-beam stationary cardiac SPECT," Engineering in Medicine and Biology Society, 2008. EMBS 2008. 30th Annual International Conference of the IEEE , pp. 5782-5785, Aug. 20-25, 2008.

Ogawa, et al., "Three-Dimensional Data Acquisition with a Semiconductor Detector in SPECT", IEEE Transactions on Nuclear Science, vol. 50, No. 1, Feb. 2003, pp. 97-104.

* cited by examiner

*Primary Examiner* — Jack Berman
*Assistant Examiner* — Meenakshi Sahu
(74) *Attorney, Agent, or Firm* — Peter Kendall

(57) ABSTRACT

A multi-view composite collimator includes a first parallel collimator segment having a plurality of collimator channels oriented at a first slant angle and a second parallel collimator segment adjacent to the first parallel collimator segment having a plurality of collimator channels oriented at a second slant angle different from the first slant angle and a bridging collimating element is provided between the first and second parallel collimator segments, wherein radiation can pass through the bridging collimating element.

10 Claims, 7 Drawing Sheets

COMPOSITE SEGMENT COLLIMATORS FOR SPECT WITHOUT DEAD ZONES

FIELD OF THE DISCLOSURE

The disclosure is related in general to systems and methods used in radiation imaging, and more particularly to systems and methods for eliminating dead spots in composite segment collimators used in SPECT imaging.

BACKGROUND

In conventional radiation imaging arrangements, collimators are used to permit only beams of radiation emanating along a particular path to pass a selected point or plane. Collimators are frequently used in radiation imagers to ensure that only radiation beams passing along a direct path from the known radiation source strike the detector thereby minimizing detection of beams of scattered or secondary radiation.

Particularly in radiation imagers used for medical diagnostic analysis or for non-destructive evaluation procedures, it is important that only radiation emanating from a known source and passing along a direct path from that source be detected and processed by the imaging equipment. If the detector is struck by undesired radiation such as that passing along non-direct paths to the detector, performance of the imaging system can be compromised.

One diagnostic technology that incorporates collimators is the gamma camera typically utilized in Single Photon Emission Computed Tomography (SPECT) scanning, which is a nuclear medicine procedure in which gamma camera(s) have traditionally rotated around the patient taking pictures from multiple angles. From these images, a computer is employed to form a tomographic image of the internal area-of-interest within the patient using a calculation process that is similar to that used in X-ray Computed Tomography (CT) and in Positron Emission computed Tomography (PET).

In the instance of SPECT scanning, a subject (patient) is infused with a radioactive substance that emits gamma rays. Conventionally, a gamma camera includes a transducer to receive the gamma rays and record an image therefrom. In order for the image to be a true representation of the subject being investigated, a collimator having collimating apertures is positioned between the transducer and the subject to screen out all of the gamma rays except those directed along a straight line through the collimating apertures between a particular part of the subject and a corresponding particular part of the transducer. Traditionally, the collimator is made of a radiopaque material such as lead and has collimating apertures, which have been formed therein by various means such as drilling, casting, or lamination of corrugated strips of lead foil.

With current systems, the number of angular views that can be acquired of a target organ, (e.g. the heart), by a SPECT gamma camera is restricted to one-view per gantry stop per detector. Acquisition of multiple views requires rotation (or at least movement) of the camera. Hence, tomographic imaging of rapid tracer dynamics (uptake and washout from various tissue and metabolic compartments) is difficult due to the necessity of scanning large massive detectors rapidly.

Bisegmental collimators, such as those described in U.S. Pat. No. 4,659,935 to Hawman, are known for improving the sensitivity of SPECT in imaging small organs. Recently, multisegmental diverging collimation has been proposed as method that can achieve higher sensitivity than multipinhole SPECT systems. It has also been realized that multisegment parallel collimation, using parallel-hole segments, but having different slant angles, can provide even more sensitivity for the same system spatial resolution.

Fabrication of a multi-view composite collimator entails the abutment of multiple collimator segments having large differences in the direction of view. Since multichannel collimators are typically formed from lead, which has a finite attenuation coefficient for gamma rays, the collimator is of finite thickness, typically a few (e.g., 2 to 4) centimeters. Regions between collimator segments in such composite collimators are often filled with a radiopaque material, such as lead. This results in gaps (i.e., uncollimated space) on the detector, which have a width approximately equal to the collimator thickness times the sum of the tangents for the slant angle of the abutting slanted collimator segments.

It would be desirable to minimize such gaps or dead zones in multi-view composite collimators in order to maximize the amount of collimated area of the detector. Such an arrangement should improve the sensitivity and imaging speed of a SPECT systems.

SUMMARY

An improved multi-view composite collimator for nuclear medicine imaging systems according to the present disclosure in which the dead spaces between two adjoining collimator segments are eliminated is disclosed. In one embodiment of the present disclosure, the dead space on the detector is eliminated by filling the dead zone with a bridging collimating element. In one embodiment, the bridging collimating element is a slit-slat collimation segment. In another embodiment, the bridging collimating element is a multi-channel collimator segment.

The multi-view composite collimator comprises a first parallel collimator segment having a plurality of collimator channels oriented at a first slant angle and a second parallel collimator segment adjacent to the first parallel collimator segment. The second parallel collimator segment has a plurality of collimator channels oriented at a second slant angle different from the first slant angle. The multi-view composite collimator further comprises a bridging collimating element provided between the first and second parallel collimator segments, wherein radiation can pass through the bridging collimating element.

According to another aspect of the present disclosure, the multi-view composite collimator can be a multi-divergent beam composite parallel slant collimator that comprises a plurality of parallel collimator segments and at least one bridging collimating element provided between two adjoining parallel collimator segments.

The use of the disclosed multi-view collimator will enable utilization of areas of the detector that conventionally were unused dead spaces at the interface regions between two adjoining composite collimator segments.

BRIEF DESCRIPTION OF THE DRAWINGS

The accompanying drawings illustrate preferred embodiments of the disclosure so far devised for the practical application of the principles thereof, and in which.

DETAILED DESCRIPTION

Figure 1:
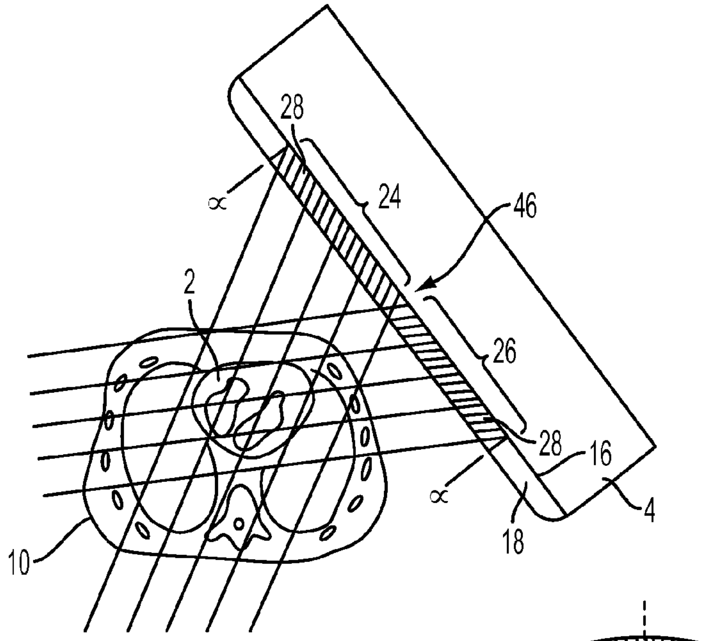
FIG. 1 is a cross-sectional view of a first embodiment of a system used in imaging the patient tissue region.
Figure 2:
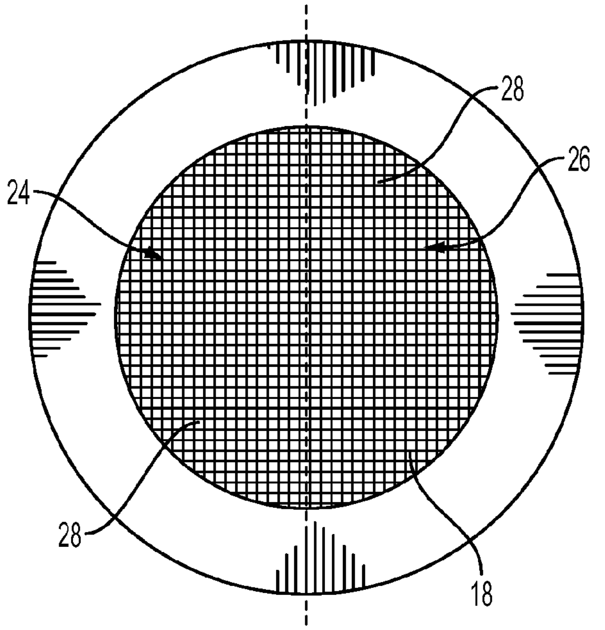
FIG. 2 shows a front view of the collimator 18 of FIG. 1.
Figure 3:
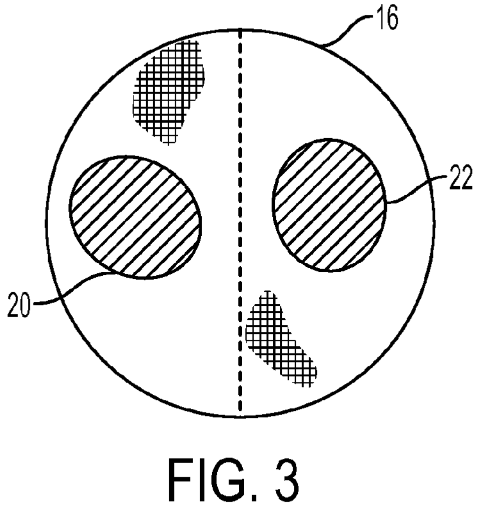
FIG. 3 is a schematic illustration of images formed by the collimator 18 on the camera's crystal detector surface.

FIGS. 1-3 show an example of a multi-view composite collimator 18, which in this particular example is a bilateral collimator. FIG. 2 shows a front view of the collimator 18. The bilateral collimator 18 is divided into two groups or segments 24, 26 of collimating holes or passageways 28. The passageways 28 within each segments 24, 26 are oriented parallel to each other but the two groups of passageways are oriented in different directions, in other words in different viewing angles, as shown in FIG. 1. In essence, each of the segments 24 and 26 of the bilateral collimator 18 is a slanted parallel collimator. The result is that the two segments 24, 26 of the collimator simultaneously produce two views 20 and 22 of the a targeted tissue region 2 of a patient 10, such as a heart, on the detector surface 16 of the gamma camera 4. The views 20 and 22 of the tissue region 2 are defined by the directions of the first segment 24 and the second segment 26 of passageways 28 in the multi-view bilateral collimator 18. The multi-view collimator 18 is made of a radiation-absorbing material, which in one embodiment is lead. Thus, obliquely directed radiation is absorbed by the collimator 18 and only radiation which is parallel to the passageways 28 will reach the detector surface 16.

In this embodiment, the orientation of the passageways 28 in the first and second slanted parallel collimator segments 24 and 26 are mirror images of each other, so their constituent passageways 28 are symmetrical (i.e. they make equal angles a with a line normal to the detector surface 16 when the collimator 18 is mounted to the camera 4). None of the passageways 28 in the first segment 24 intersects any of the passageways 28 in the second segment 26. Thus, the first and second views 20 and 22 do not overlap.

Figure 4:
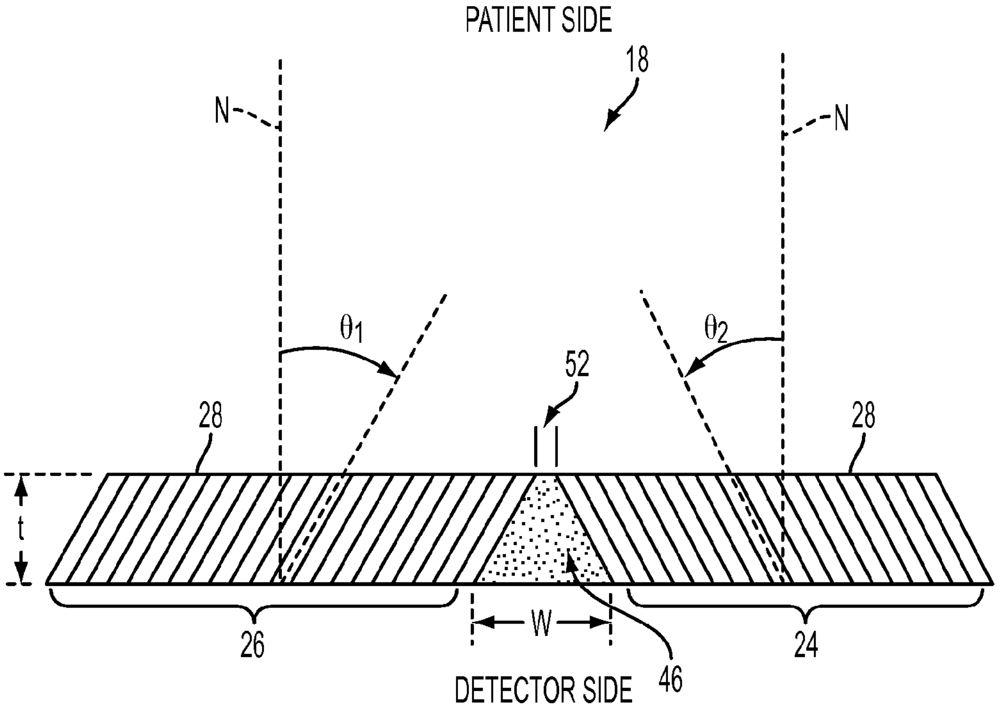
FIG. 4 is a side view of two adjoining parallel slant collimator segments.

Because the collimator passageways 28 in each segment are slanted towards the intended target tissue region being imaged, there is a gap or a dead space 46 at the interface region between the two segments 24, 26 on the detector side of the collimator 18. This can be better seen in the side cross-sectional view of the bilateral collimator 18 shown in FIG. 4. In FIG. 4, the detector surface 16 is on the bottom side of the illustration and the patient side is on the top side. The dead space 46 exists between the two segments 24 and 26 as shown. The dead space 46 is a gap that is wider on the detector side of the collimator 18 than the patient side. The dead space 46 has a width W on the detector side and a narrower width 52 on the patient side and a cross-section of the dead space 46 forms a trapezoid. In conventional multi-view composite collimators, the dead spaces 46 are filled with lead. The lead filler absorbs incoming gamma rays, which if they could be captured by the detector would increase the sensitivity of the SPECT imaging system.

Figure 5:
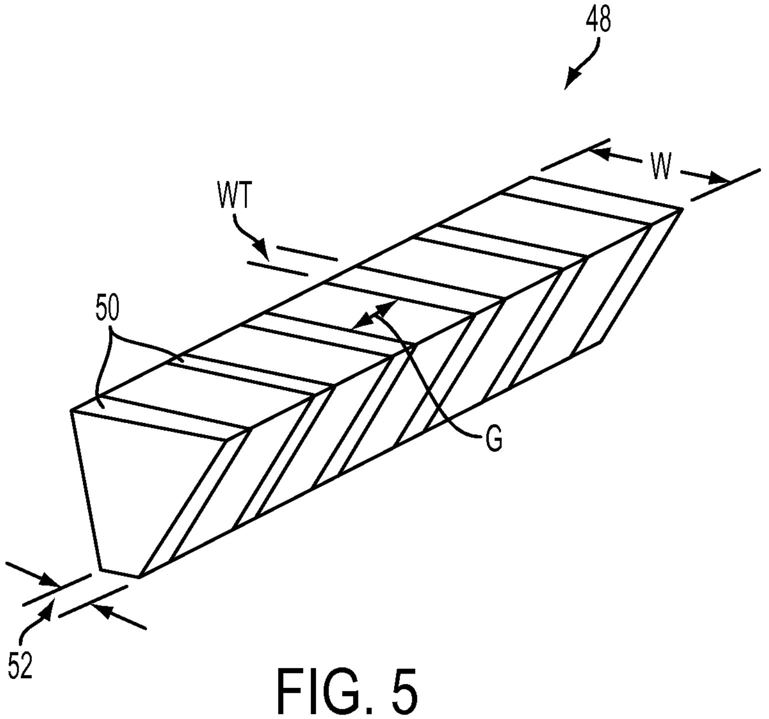
FIG. 5 shows a perspective view of a slit-slat collimator segment embodiment of a bridging collimating element according to an embodiment of the present disclosure.

According to an embodiment of the present disclosure, an appropriately shaped bridging collimating element is provided in the interface region filling the dead space 46 in order to make the dead space useful. In this example, the bridging collimating element is a slit-slat collimator segment 48 shown in FIG. 5. The slit-slat collimator segment 48 comprises a plurality of trapezoidal-shaped slat elements 50 spaced apart by a distance G, thus forming slits between the slat elements 50. Each of the slat elements 50 has a thickness of WT. Each of the slat elements 50 has a trapezoidal shape that matches the cross-section of the dead space 46. The slat elements have a width W at the wide end (the detector side) and a width 52 at the narrow end (the patient side) as shown. The actual dimensions G, WT, W and 52 is to be appropriately determined according to the particular collimator dimensions and application. For example, referring to the configuration shown in FIG. 4, the detector side width W of the slat elements 50 can be determined according to the formula $W=t^*(\tan\theta_1+\tan\theta_2)$, where t is the thickness of the collimator 18 and $\theta_1$ and $\theta_2$ are the slant angles of the passageways 28 in the two adjacent collimator segments 26 and 24, respectively.

Figure 6:
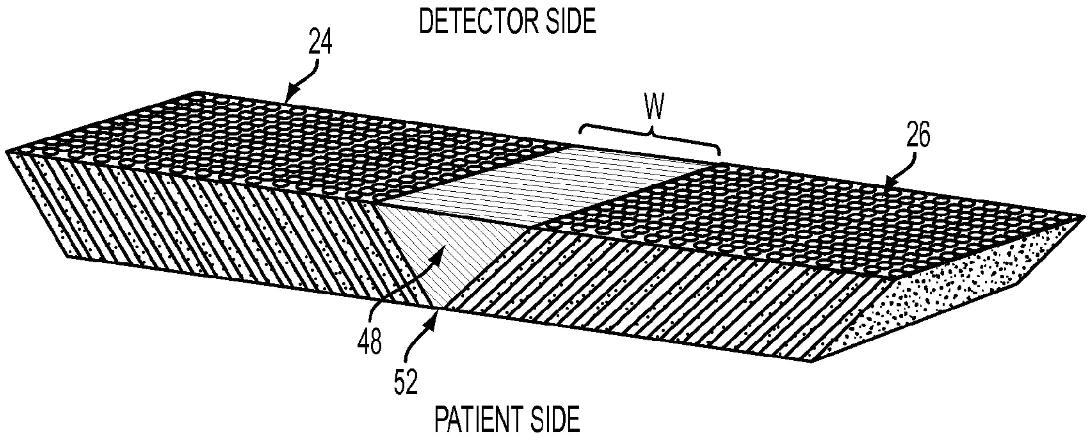
FIG. 6 shows a perspective view of the slit-slat collimator segment bridging collimating element filling the formerly dead space between two adjoining slant collimator segments.

FIG. 6 shows a perspective view of the bilateral collimator 18 where the slit-slat collimator segment 48 is provided in the interface region between the two adjoining collimator segments 24 and 28. By filling the conventionally dead space 46 in the interface region of the collimator 18 with the slit-slat collimator segment 48, that portion of the collimator 18 does not completely absorb the gamma rays and thus the sensitivity of the SPECT gamma camera 4 is increased.

Figure 7:
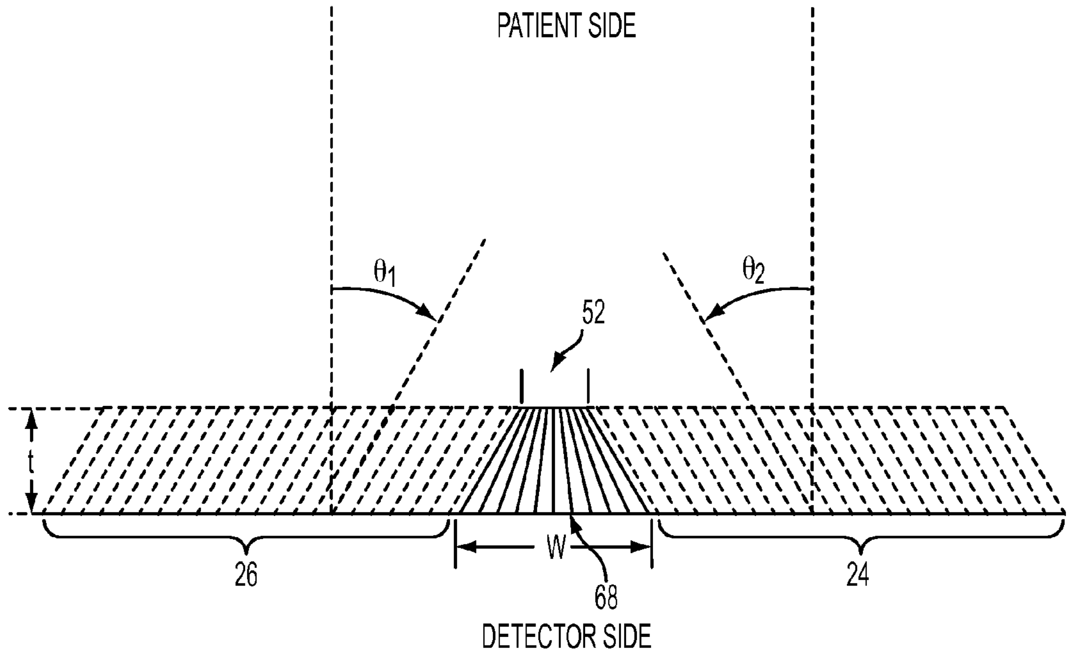
FIG. 7 shows a side view of a multi-channel collimator embodiment of a bridging collimating element according to an embodiment of the present disclosure.

According to another embodiment of the present disclosure, the bridging collimating element can be a multichannel collimator segment 68 shown in FIG. 7.

Similar to the bilateral collimator 18 discussed above, another example of multi-view composite collimators, multi-convergent beam composite parallel slant collimators also have dead spaces between each of the several collimator segments. According to another aspect of the present disclosure, the dead spaces in multi-convergent beam composite parallel slant collimators can be made useful by providing a bridging collimating element (a slit-slat collimating segment 48 or a multi-channel collimating segment 68) in the interface region between each pair of adjacent collimating segments.

Figure 8:
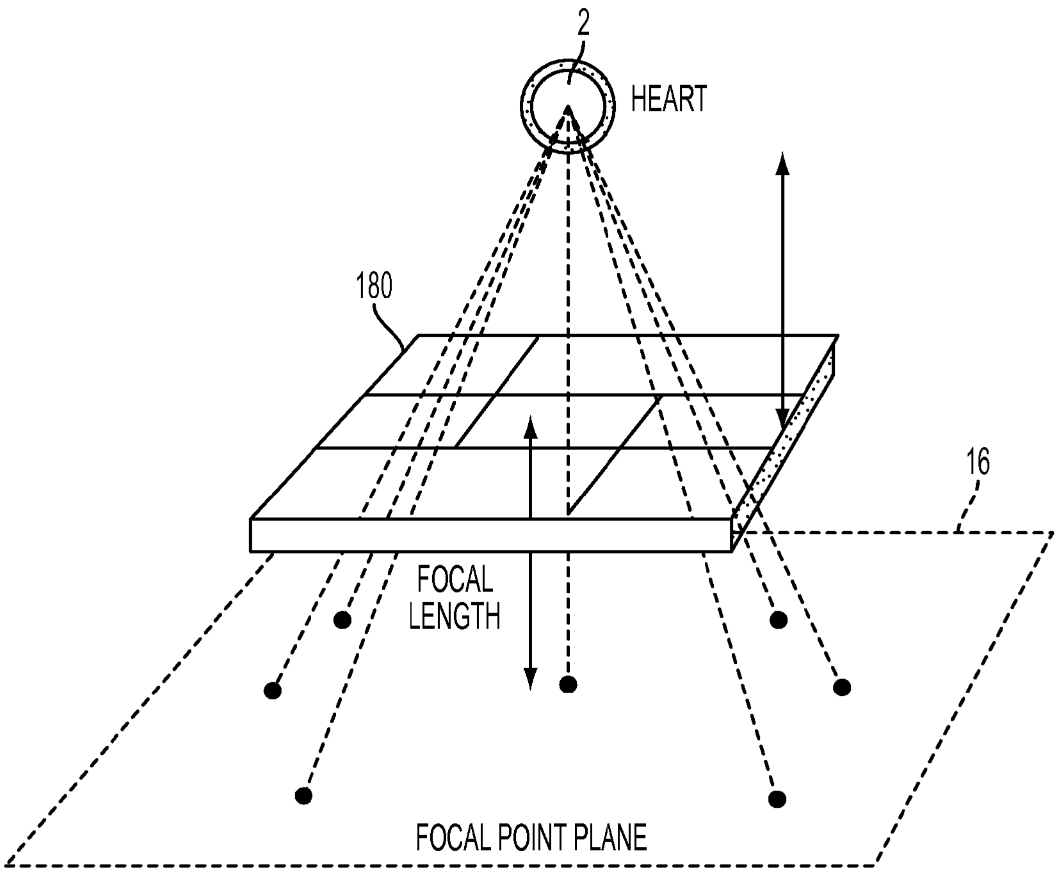
FIG. 8 shows a perspective view of a seven-segment multi-divergent beam composite parallel slant collimator.
Figure 9:
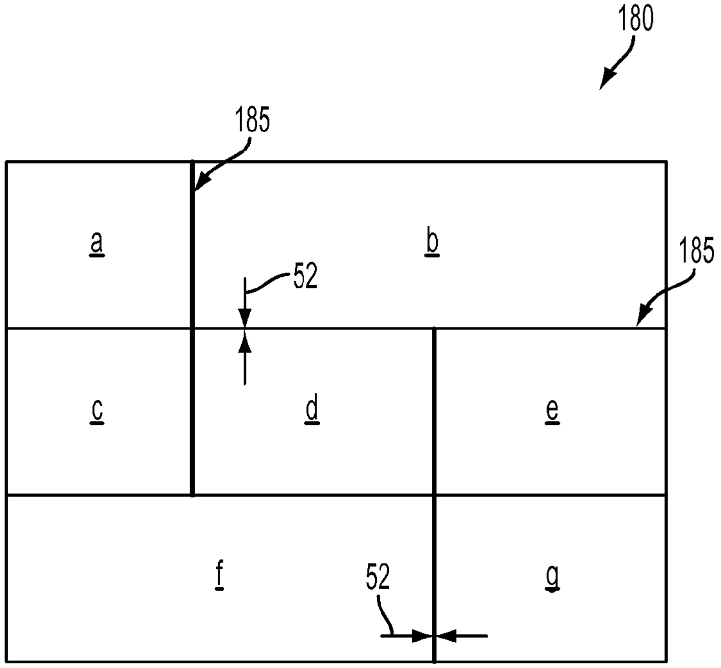
FIG. 9 shows a patient-side view of a seven-segment multi-divergent beam composite parallel slant collimator.
Figure 10:
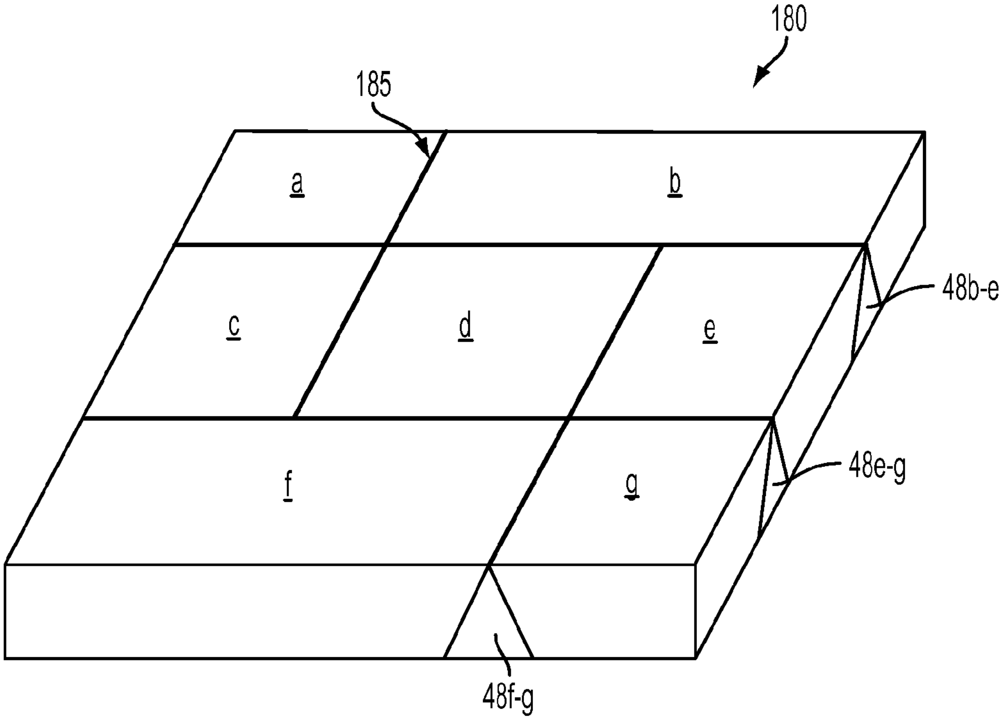
FIG. 10 shows a perspective view of the seven-segment multi-divergent beam composite parallel slant collimator of FIG. 9.

FIGS. 8-10 show various views of a multi-convergent beam composite parallel slant collimator 180. The multi-convergent beam composite collimator is comprised of several collimator segments a, b, c, d, e, f, and g. Each of the collimator segments a-g has a different viewing angle and each forms an image of the target tissue region 2 on the detector surface 16.

FIGS. 9 and 10 show a plan view and a perspective view, respectively, of the multi-divergent beam composite parallel slant collimator 180 from the patient side. Each of the collimator segments a-g is a parallel beam collimator (i.e., the passageways in each segment are in parallel arrangement) but each segment has different viewing angle. Generally, the center segment d is an orthogonal parallel beam collimator. Because of the different viewing angles of each segment a-g, dead spaces exist at the interfaces 185 between any two adjacent collimator segments a-g, similar to the bilateral collimator 18. According to an embodiment of the present disclosure, these dead spaces are filled with bridging collimating elements (48 or 68) as illustrated in FIG. 10. In FIG. 10, three of such bridging collimating elements 48*b-e*, 48*e-g*, and 48*f-g* can be seen. The bridging collimating element 48*b-e* is a slit-slat collimating segment filling the gap between the collimator segments b and e. The bridging collimating element 48*e-g* is a slit-slat collimating segment filling the gap between the collimator segments b and g. The bridging collimating element 48*f-g* is a slit-slat collimating segment filling the gap between the collimator segments f and g.

For each of the embodiments discussed herein, the bridging collimating elements 48, 60 provide an additional image, albeit one that is strongly anamorphic, of the target tissue region 2 to thereby improve sensitivity of the overall system. By anamorphic it is meant that the scale or magnification of the image differs in the orthogonal directions, one direction being parallel to the gap between the two adjacent collimator segments, and the other direction transverse to the gap.

According to another embodiment of the present disclosure, multi-divergent beam composite parallel slant collimators are another example of multi-view composite collimators in which the bridging collimating element of the present invention can be applied to eliminate dead spaces.

The disclosed system improves the speed of the multiview collimator for stationary SPECT acquisition. For improved angular sampling, it can also be used in a rotating gamma SPECT system that uses a multiview collimator. The disclosed system and method can also be used for a collimator in a multi-head detector SPECT cardiac system with sensitivity about 4 to 5 times of a dual-detector parallel beam collimator camera. The system would provide sufficient views for stationary acquisition of cardiac images. This would simplify imaging for studies having fast tracer kinetics. It could also be used to advantage for gated cardiac SPECT studies.

Alternatively, disclosed system can be used in a multihead-detector SPECT system where the number of angular views that the system steps through during acquisition is reduced due to the increase in the number of views obtained using a multiview collimator for each angular step of the gantry.

Although this invention has been described with reference to particular exemplary embodiments, it is to be understood that the embodiments and variations shown and described herein are for illustration purposes only. Modifications to the current design may be implemented by those skilled in the art, without departing from the scope of the invention.

We claim:

1. A multi-view composite collimator for a nuclear medicine imaging system, the collimator comprising:

a first parallel collimator segment having a plurality of collimator channels oriented at a first slant angle;

a second parallel collimator segment adjacent to the first parallel collimator segment and having a plurality of collimator channels oriented at a second slant angle different from the first slant angle; and a bridging collimating element provided between the first and second parallel collimator segments, wherein radiation can pass through the bridging collimating element.

2. The multi-view composite collimator of claim 1, wherein the bridging collimating element is a slit-slat collimating segment.

3. The multi-view composite collimator of claim 1, wherein the bridging collimating element is a multi-channel collimating segment.

4. The multi-view composite collimator of claim 2, wherein the slit-slat collimating segment is configured to provide parallel collimation in one direction and fan beam collimation in another direction.

5. The multi-view composite collimator of claim 1, wherein the multi-view composite collimator is a bilateral collimator and the first and second parallel collimator segments are parallel slant collimator segments.

6. The multi-view composite collimator of claim 1, wherein the multi-view composite collimator is a multi-divergent beam or multi-convergent beam composite parallel slant collimator.

7. A multi-convergent beam composite parallel slant collimator for a nuclear medicine imaging system, the collimator comprising:

a plurality of parallel collimator segments, each parallel collimator segment having a plurality of collimator channels oriented at a slant angle that is different from the slant angle of an adjacent parallel collimator segment; and at least one bridging collimating element provided between any pair of parallel collimator segments, wherein radiation can pass through the bridging collimating element.

8. The multi-convergent beam composite parallel slant collimator of claim 7, wherein the bridging collimating element is a slit-slat collimating segment.

9. The multi-convergent beam composite parallel slant collimator of claim 7, wherein the bridging collimating element is a multi-channel collimating segment.

10. The multi-convergent beam composite parallel slant collimator of claim 8, wherein the slit-slat collimating segment is configured to provide parallel collimation in one direction and fan beam collimation in another direction.

* * * * *